Dec. 1, 1970 HIDEO WATANABE ET AL 3,544,469

FERROELECTRIC CERAMIC

Filed Aug. 7, 1967 2 Sheets-Sheet 1

INVENTORS

Hideo Watanabe

Yushi Kusunoki

By, Wenderoth, Lind & Ponack

Attys.

INVENTORS
Hideo Watanabe
Yushi Kusunoki
By, Wenderoth, Lind & Ponack, Attys.

United States Patent Office 3,544,469

Patented Dec. 1, 1970

3,544,469

FERROELECTRIC CERAMIC

Hideo Watanabe and Yushi Kusunoki, Kofu-shi, Japan, assignors to TDK Electronics Co., Ltd., Chiyoda-ku, Japan Filed Aug. 7, 1967, Ser. No. 658,926
Claims priority, application Japan, Aug. 29, 1966, 41/56,438
Int. Cl. C04b *35/46, 35/48*
U.S. Cl. 252—62.9 1 Claim

ABSTRACT OF THE DISCLOSURE

Piezoelectric ceramic compositions of the ternary system $Pb(Co_{1/3}Nb_{2/3})O_3$—$PbTiO_3$—$PbZrO_3$ are disclosed. These compositions are useful in various electrocommunication devices.

This invention relates to a novel piezoelectric material consisting of 5 to 80 mol percent of lead titanate $PbTiO_3$, more than 5 mol percent of lead zirconate $PbZrO_3$, and 0 to 50 mol percent of lead niobo-cobaltate $$Pb(Nb_{2/3}Co_{1/3})O_3$$

This piezoelectric ceramic composition is produced in the manner hereinafter described.

The combined new materials, lead titanate $PbTiO_3$, lead zirconate $PbZrO_3$, and lead niobocobaltate $$Pb(Nb_{2/3}Co_{1/3})O_3$$

are wet mixed in a ball mill for 24 hours and then reacted by heating for 2 hours.

The products of the reaction are crushed and milled into a fine powder so that a particle diameter will be less than 1$\mu$.

After a binder is added, the fine powder is pressed into a disk of a diameter 16 mm. and of a thickness 1 mm.

This disk is sintered for 2 hours in a sealed furnace.

The formed disk is used after an activating treatment known in the art.

For instance, a pair of electrodes are applied to the opposite faces of the disk, to which D.C. voltage of 2500 to 4000 v. is applied in a silicone oil in order to polarize the disk.

DETAILED EXPLANATION OF INVENTION

This invention relates to new composition of matter, which have ferroelectric properties especially desirable for piezoelectric ceramics.

An object of this invention is to provide a piezoelectric ceramic, which is easily polarized and possesses an electromechanical coupling coefficient and a mechanical Q-value higher than those of the known piezoelectric ceramics, i.e. a piezoelectric ceramic exhibiting such properties that are desirable for use in various electrocommunication devices.

In recent years the demands for piezoelectric ceramics have greatly increased.

Electrostrictive oscillators containing such piezoelectric ceramics are employed as ultrasonic generators, audio devices, transducers of electromechanical filters, ceramic filters and so forth.

In the present days, the characteristics required for the oscillators, which are used in resonance systems like ultrasonic generators, transducers of electromechanical filters, ceramic filters, and so forth, are such that their electomechanical coupling coefficient K is more than 15 percent, and at the same time they have a high mechanical Q-value.

In this connection piezoelectric ceramic possess very suitable properties.

As is well known, single crystals such as quartz, Rochelle salts, and so forth have been employed as piezoelectric materials.

They have a disadvantage in that they cannot be easily prepared or shaped.

Later a polycrystalline ferroelectric ceramics have come into use as piezoelectric materials.

Several materials such as barium titanate $BaTiO_3$, potassium niobate $KNbO_3$ and so forth were invented.

Among these materials, solid solutions of lead titanate $PbTiO_3$ and lead zirconate $PbZrO_3$, both of which have a perovskite type structure, show excellent piezoelectric properties.

The solid solutions of this system, which are located near the morphotropic boundaries exhibit peculiar properties, and can be employed in practical use.

In this connection some improvements on this lead titano-zirconate ceramic $Pb(TiZr)O_3$ have been by various modifications, such as addition of a small amount of the third component, which changes the characteristic values.

Substitution for plumbous ions $Pb^{2+}$ with other divalent ions like $Sr^{2+}$, $Ca^{2+}$, etc., improves the sintering properties.

A further modification may be realized in the ternary system consisting of the above mentioned binary system and lead stannate $PbSnO_3$, which systems also have perovskite type structures.

This is a natural extension of lead titano-zirconate ceramics technology being guided theoretically with the result that the compositions on the morphotropic boundaries show good piezoelectric properties.

At present, however, their electromechanical coupling coefficient are not sufficiently high.

A feature of this invention is a piezoelectric ceramic composed of ferroelectric lead niobo-cobaltate $$Pb(Nb_{2/3}Co_{1/3})O_3$$

with perovskite type structure, which has sufficiently high values of electromechanical coupling coefficient and mechanical Q-value, and can be easily polarized.

According to this invention, the raw materials are combined so that the composition is in the range of 5 to 80 mol percent of lead titanate, 5 to 95 mol percent of lead zirconate, and 0 to 50 mol percent of lead niobo-cobaltate, and then the named ceramic is manufactured in the ordinary way of manufacturing piezoelectric ceramics containing lead.

Polarization is carried out in an oil bath. At that time, the temperature can be lower than 120° C.

The reason why they range of compositions of the piezoelectric ceramic of this invention is limited as above expressed will be given hereinafter.

As is clearly seen in FIG. 1, FIG. 2, and FIG. 3, the electromechanical coupling coefficient will be lowered to less than 15% and the ceramic cannot be suitably used as a piezoelectric material, when the content of lead titanate ($PbTiO_3$) is less than 5 mol percent or 80 mol percent, or the content of lead zirconate ($PbZrO_3$) is less than 5 mol percent, or the content of lead niobo-cobaltate is more than 50 mol percent.

FIG. 1, FIG. 2 and FIG. 3 are triangular diagrams showing the relations between the values electromechanical coupling coefficients, specific dielectric constant, and mechanical Q-value respectively as well as the contents of the three components lead titanate $PbTiO_3$, lead zirconate $PbZrO_3$ and lead niobo-cobaltate $$Pb(Nb_{2/3}Co_{1/3})O_3$$

utilized in this invention.

In FIG. 1, three end components, $Pb(Nb_{2/3}Co_{1/3})O_3$, $PbTiO_3$ and $PbZrO_3$ are located at the triangle and the edges are divided at the molar ratio of these components.

The numerical value on each compositional point gives the radial electromechanical coupling coefficient at the composition corresponding to the point.

Figure 1:
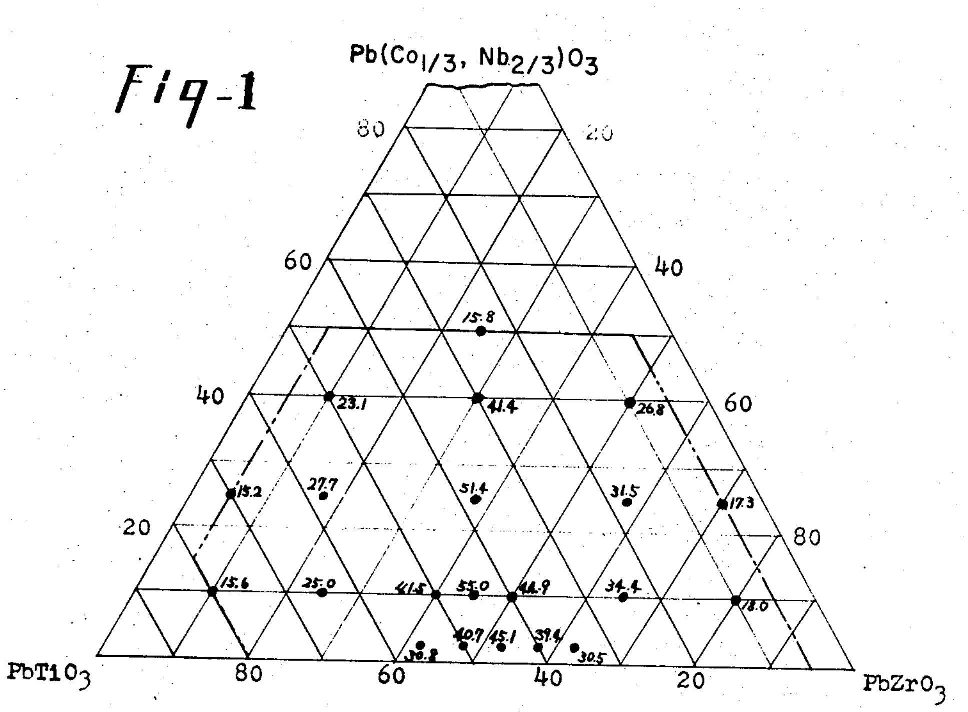
Figure 2:
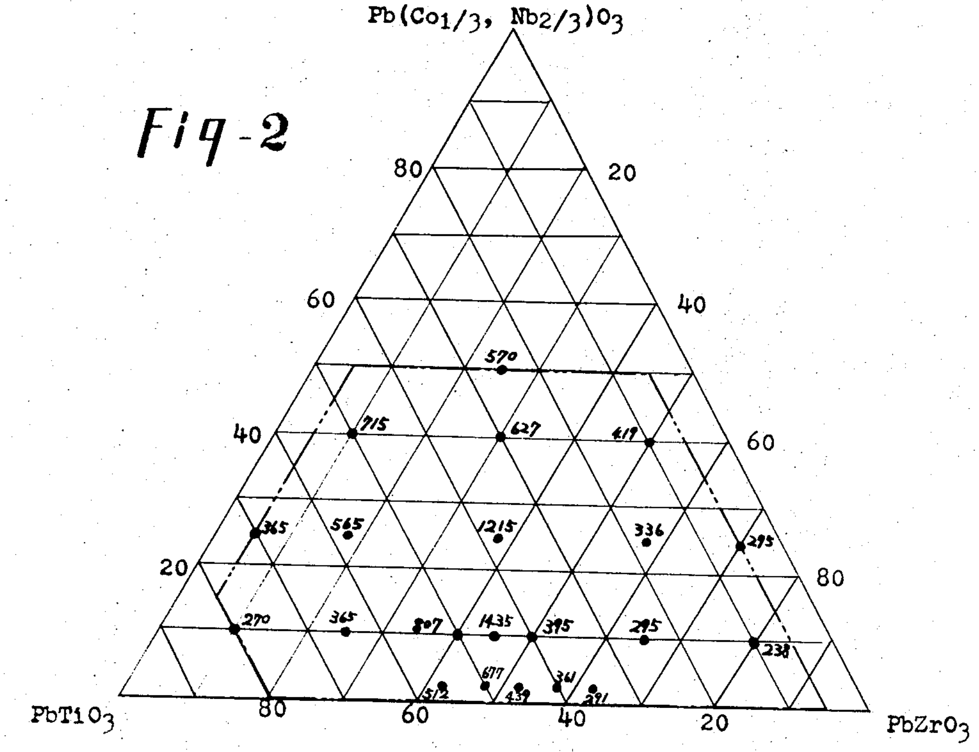
FIG. 2 is the same compositional diagram as FIG. 1, in which the numerical value at each point give the specific dielectric constant at the composition corresponding to the point.
Figure 3:
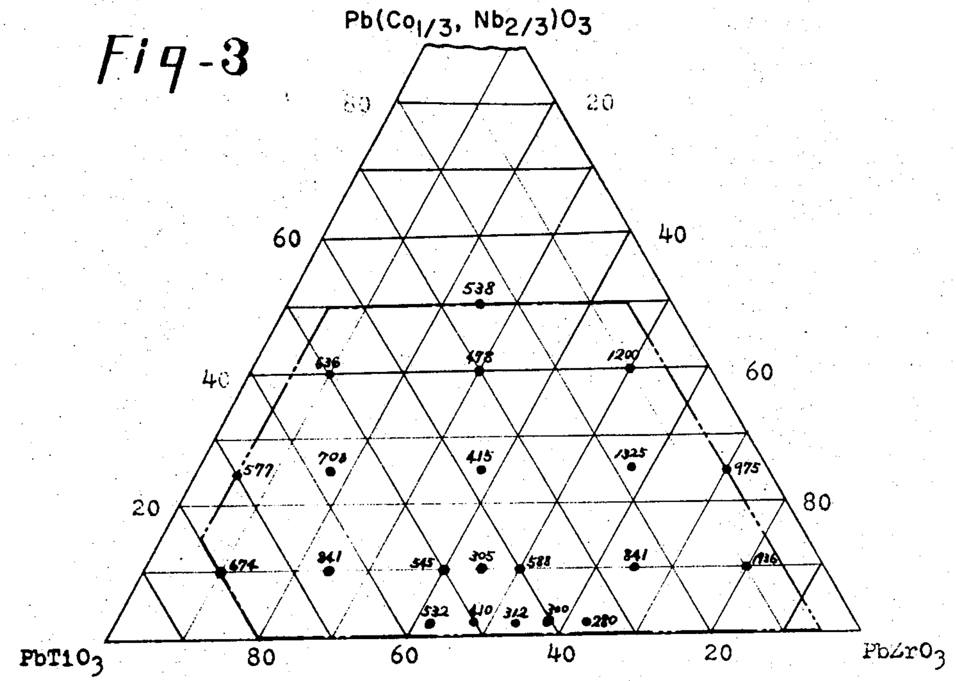
FIG. 3 is also a same diagram as FIG. 1, in which the mechanical Q-value at each composition is given.

This invention is further illustrated by the following examples.

EXAMPLE 1

Lead oxide PbO, titanium oxide $TiO_2$, zirconium oxide $ZrO_2$, niobium oxide $Nb_2O_5$ and cobalt oxide CoO were combined so that the composition is 45 mol percent $PbTiO_3$, 45 mol percent $PbZrO_3$ and 10 mol percent $$Pb(Nb_{2/3}Co_{1/3})O_3$$

and said composition is then mixed in a liquid in a ball mill.

The mixture was subjected to prefiring at 850° C. in air.

The product was milled so that the particle diameter was less than $1\mu$.

The milled powder was mixed with a suitable binding agent such as polyvinyl alcohol, and pressed into disks of the diameter 16 mm. and of the thickness 1 mm.

These were fired again to maturity at 1200° C. in a sealed furnace to avoid volatilization.

The fired disks were then polarized in the manner known in the art; electrodes were applied to opposite faces of the disks and a D.C. electric field of intensity 4000 v./mm. was applied in silicone oil.

The characteristic values of the piezoelectric ceramic manufactured in this manner were as follows; the radial electromechanical coupling coefficient Kr; 55.0% the mechanical Q-value $Qm$; 305, the specific dielectric constant (at 1 kc./s.)$\epsilon$; 1435.

EXAMPLE 2

The raw materials were combined so that the composition might be 37.5 mol percent $PbTiO_3$, 37.5 mol percent $PbZrO_3$, and 25 mol percent $Pb(Co_{1/3}Nb_{2/3})O_3$.

Ceramic disks were manufactured by the same processes as in the Example 1 under the same conditions as in the Example 1.

A pair of electrodes were applied to these disks, and D.C. electric field of intensity 2500 v./mm. was applied between these electrodes in order to polarize the disks.

The characteristic values of piezoelectric ceramics manufactured in the manner mentioned above were as follows; the radial electromechanical coupling coefficient Kr; 51.4%, the mechanical Q-value $Qm$; 415, the specific dielectric constant (at 1 kc./s.)$\epsilon$; 1215.

In the Table 1 are tabulated the characteristic values of piezoelectric ceramics of various compositions in this invention, which have been manufactured in the same manner as in the above mentioned example.

The composition of each specimen is designated as $xPb(Co_{1/3}Nb_{2/3})O_3—yPbTiO_3—zPbZrO_3$ in molar ratio, where $x+y+z=100$, and the values of X, Y and Z are given in the corresponding columns.

The characteristic values are given in the corresponding columns, which are, from the left, the density of the piezoelectric ceramic (in g./cm.$^3$), the radial electromechanical coupling coefficient Kr (in percent), the mechanical Q-value $Qm$, and the specific dielectric constant.

TABLE 1

The characteristics of the piezoelectric ceramics of the system $xPB(Co_{1/3}Nb_{2/3})O_3—y PbTiO_3—z PbZrO_3$.

| No of specimen | x mol percent | y mol percent | z mol percent | Density of ceramic (g./cm.$^3$) | Kr., percent | Qm | E |
|---|---|---|---|---|---|---|---|
| 1 | 1 | 50 | 49 | 7.5 | 40.7 | 419 | 677 |
| 2 | 1 | 45 | 54 | 7.5 | 45.1 | 312 | 439 |
| 3 | 1 | 40 | 59 | 7.5 | 39.4 | 300 | 361 |
| 4 | 10 | 50 | 40 | 7.6 | 41.5 | 545 | 807 |
| 5 | 10 | 45 | 45 | 7.6 | 55.0 | 305 | 1,435 |
| 6 | 10 | 40 | 50 | 7.6 | 44.9 | 588 | 398 |
| 7 | 10 | 25 | 65 | 7.6 | 34.4 | 841 | 294 |
| 8 | 10 | 10 | 80 | 7.5 | 18.0 | 1,936 | 238 |
| 9 | 25 | 37.5 | 37.5 | 7.7 | 51.4 | 415 | 1,215 |
| 10 | 25 | 17.5 | 57.5 | 7.8 | 31.5 | 1,325 | 336 |
| 11 | 25 | 5 | 70 | 7.8 | 17.3 | 975 | 295 |
| 12 | 40 | 30 | 30 | 7.8 | 41.4 | 478 | 627 |
| 13 | 40 | 10 | 50 | 7.8 | 26.8 | 1,200 | 479 |

What we claim is:

1. A ferroelectric ceramic having a feature that it is manufactured by sintering the mixture of the composition within range $0<x\leq0.5$, $0.05\leq y\leq0.8$ and $0.05\leq z<0.95$, where $x+y+z=1$, in a general formula $$Pb[(Nb_{2/3}, Co_{1/3})_x, Ti_y, Zr_z]O$$

References Cited

UNITED STATES PATENTS

| | | | |
|---|---|---|---|
| 3,268,453 | 8/1966 | Ouchi et al. | 252—62.9 |
| 3,268,783 | 8/1966 | Saburi | 106—399 |
| 3,425,944 | 2/1969 | Ouchi et al. | 252—62.9 |

TOBIAS, E. LEVOW, Primary Examiner

J. COOPER, Assistant Examiner

U.S. Cl. X.R.

106—39